United States Patent
Burton et al.

(10) Patent No.: US 8,545,804 B2
(45) Date of Patent: Oct. 1, 2013

(54) METHOD FOR PREPARING LTA-TYPE ZEOLITES USING A NOVEL STRUCTURE DIRECTING AGENT

(71) Applicants: Allen Wayne Burton, Stewartsville, NJ (US); Ramzy M. Shayib, Midland, MI (US)

(72) Inventors: Allen Wayne Burton, Stewartsville, NJ (US); Ramzy M. Shayib, Midland, MI (US)

(73) Assignee: Chevron U.S.A. Inc., San Ramon, CA (US)

(*) Notice: Subject to any disclaimer, the term of this patent is extended or adjusted under 35 U.S.C. 154(b) by 81 days.

(21) Appl. No.: 13/679,829

(22) Filed: Nov. 16, 2012

(65) Prior Publication Data

US 2013/0078181 A1    Mar. 28, 2013

Related U.S. Application Data

(62) Division of application No. 13/233,232, filed on Sep. 15, 2011, now Pat. No. 8,337,808.

(51) Int. Cl.
     *C01B 39/00*      (2006.01)
     *C01B 33/36*      (2006.01)
     *C01F 7/00*      (2006.01)

(52) U.S. Cl.
     USPC ............ 423/700; 423/701; 423/702

(58) Field of Classification Search
None
See application file for complete search history.

(56) References Cited

U.S. PATENT DOCUMENTS

| | | | |
|---|---|---|---|
| 2,882,243 | A | 4/1959 | Milton |
| 3,314,752 | A | 4/1967 | Kerr |
| 3,375,205 | A | 3/1968 | Wadlinger et al. |
| 4,503,023 | A | 3/1985 | Breck et al. |
| 4,910,006 | A | 3/1990 | Zones et al. |
| 5,316,753 | A | 5/1994 | Nakagawa |
| 5,371,307 | A | 12/1994 | Guth et al. |
| 6,471,939 | B1 | 10/2002 | Boix et al. |
| 7,056,490 | B2 | 6/2006 | Harbuzaru et al. |
| 7,109,130 | B2 | 9/2006 | Davis |
| 7,553,477 | B2 | 6/2009 | Corma Canos et al. |
| 2009/0220661 | A1 | 9/2009 | Moliner Marin et al. |

FOREIGN PATENT DOCUMENTS

WO      2008033230      3/2008

OTHER PUBLICATIONS

A. Corma, F. Rey, J. Rius, M.J. Sabater and S. Valencia "Supramolecular Self-Assembled Molecules as Organic Directing Agent for Synthesis of Zeolites" Nature 2004, 431, 287-290.
PCT International Search Report, PCT/US2012/043512, mailed Jan. 3, 2013.

*Primary Examiner* — Curtis Mayes
*Assistant Examiner* — Bijay Saha
(74) *Attorney, Agent, or Firm* — Terrence Flaherty

(57) ABSTRACT

This disclosure relates to LTA-type zeolites which are synthesized using tris[2-(isopropylamino)ethyl]amine as a structure directing agent.

5 Claims, 1 Drawing Sheet

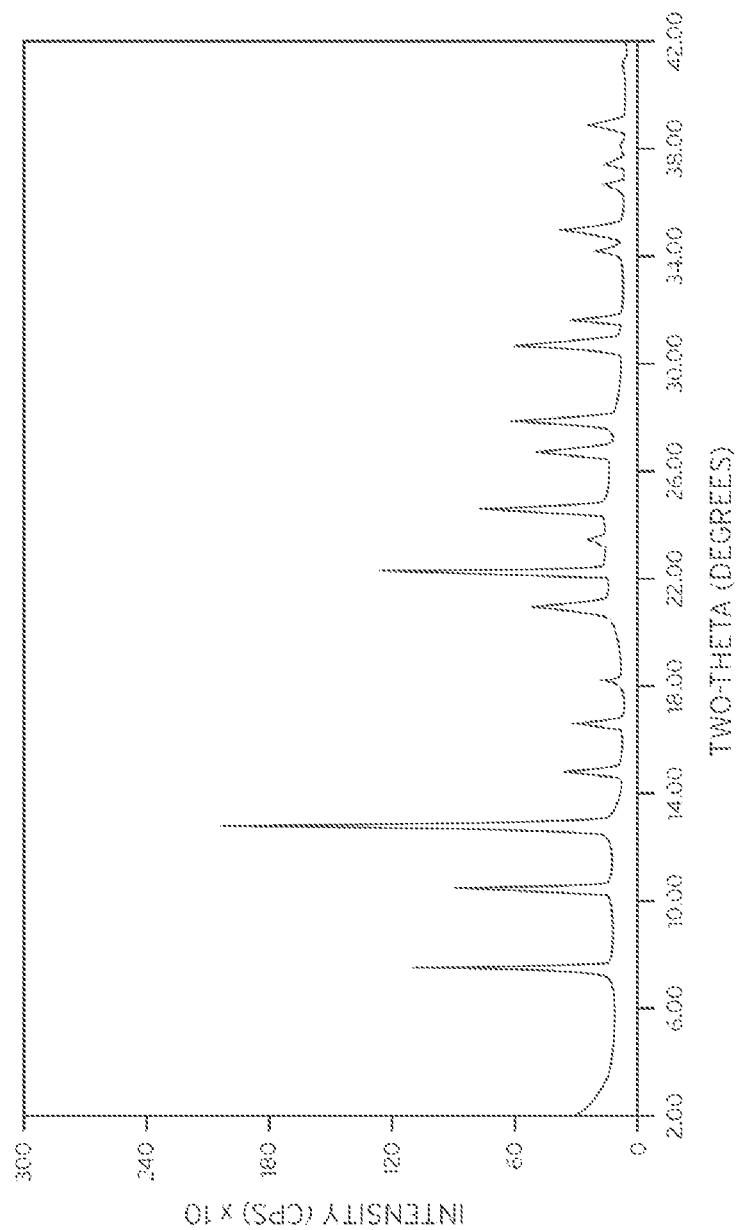

METHOD FOR PREPARING LTA-TYPE ZEOLITES USING A NOVEL STRUCTURE DIRECTING AGENT

This application is a divisional application of application Ser. No. 13/233,232, filed Sep. 15, 2011, now U.S. Pat. No. 8,337,808, and claims priority therefrom.

TECHNICAL FIELD

The present invention relates to a method for preparing LTA-type zeolites using tris[2-(isopropylamino)ethyl]amine as a structure directing agent.

BACKGROUND

Zeolites having the LTA framework topology defined by the connectivity of the tetrahedral atoms (referred to herein simply as LTA) are known. See, for example, Ch. Baerlocher et al., Atlas of Zeolite Framework Types, 6th Revised Edition, 2007 of the International Zeolite Association. Examples of LTA zeolites include the zeolites designated ITQ-29 and 1M-11. ITQ-29 and methods for making it are disclosed in U.S. Pat. No. 7,553,477. This patent discloses the preparation of zeolite ITQ-29 using a structure directing agent (SDA) derived from the methylation of julolidine. However, the quaternization of the amine is slow and the yields of the methylated product are not high. Zeolite 1M-11 and methods for making it are disclosed in U.S. Pat. No. 7,056,490. This patent discloses the preparation of 1M-11 using a costly cryptand as an SDA.

It would be desirable to find a way to eliminate the use of complex and costly SDAs in the synthesis of LTA-type zeolites. It has now been found that LTA-type zeolites can be prepared using tris[2-(isopropylamino)ethyl]amine as a structure directing agent.

SUMMARY

In accordance with the present invention, there is provided a method for preparing an LTA-type zeolite, the method comprising: (a) preparing a reaction mixture comprising (1) at least one source of an oxide of a tetravalent element other than germanium; (2) optionally, at least one source of an oxide of germanium; (3) fluoride ions; (4) water; and (5) tris[2-(isopropylamino)ethyl]amine as a structure directing agent; and (b) maintaining the reaction mixture under conditions sufficient to form crystals of the zeolite.

The present invention also provides an LTA zeolite whose composition, as-synthesized and in its anhydrous state, in terms of mole ratios, is as follows:

| | |
|---|---|
| $TO_2/GeO_2$ | 1 to ∞ |
| $Q/(TO_2 + GeO_2)$ | 0.03 to 0.10 | wherein T is a tetravalent element other than germanium and Q is a tris[2-(isopropylamino)ethyl]amine structure directing agent.

BRIEF DESCRIPTION OF THE DRAWINGS

FIG. 1 shows the powder X-ray diffraction (XRD) pattern of the product of Example 1.

DETAILED DESCRIPTION

The following terms will be used throughout the specification and will have the following meanings unless otherwise indicated.

The term "active source" means a reagent or precursor material capable of supplying an element in a form that can react and be incorporated into the zeolite structure. The terms "source" and "active source" are used interchangeably herein.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

In general, the LTA-type zeolite is prepared by: (a) preparing a reaction mixture comprising (1) at least one source of an oxide of a tetravalent element other than germanium; (2) optionally, at least one source of an oxide of germanium; (3) fluoride ions; (4) water; and (5) tris[2-(isopropylamino)ethyl]amine as a structure directing agent; and (b) maintaining the reaction mixture under conditions sufficient to form crystals of the zeolite.

The composition of the reaction mixture from which the zeolite is formed, in terms of mole ratios, is identified in Table 1 below:

TABLE 1

| Reactants | Broad | Preferred |
|---|---|---|
| $TO_2/GeO_2$ | 1.0 to ∞ | 2 to 10 |
| $Q/(TO_2 + GeO_2)$ | 0.1 to 1.0 | 0.15 to 0.4 |
| $F/(TO_2 + GeO_2)$ | 0.1 to 1.0 | 0.3 to 0.6 |
| $H_2O/(TO_2 + GeO_2)$ | 1 to 50 | 3 to 25 | wherein composition variables T and Q are as described herein above.

It should be noted that the $TO_2/GeO_2$ mole ratio of 1 to ∞ includes the case where there is no $GeO_2$, i.e., the mole ratio of $TO_2$ to $GeO_2$ is infinity. In that case, the zeolite is comprised essentially of all $TO_2$.

In one embodiment, the tetravalent element (T) is selected from the group consisting of silicon (Si), titanium (Ti), tin (Sn), and mixtures thereof. In another embodiment, T is Si. Sources of elements for composition variable T include oxides, hydroxides, acetates, oxalates sulfates, and ammonium salts of the element(s) selected for T.

When T is Si, sources of Si include fumed silica, precipitated silicates, silica hydrogel, silicic acid, colloidal silica, tetra-alkyl orthosilicates (e.g., tetraethyl orthosilicate), and silica hydroxides.

Sources of germanium (Ge) include germanium oxide, germanium alkoxides (e.g., germanium ethoxide, germanium isopropoxide), germanium chloride and sodium germanate.

The structure directing agent useful in the process of the present invention is tris[2-(isopropylamino)ethyl]amine which represented by the following structure (1):

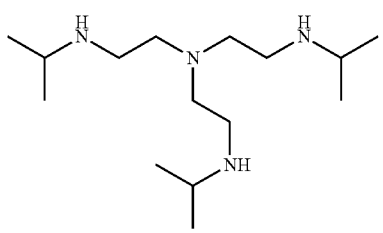

tris[2-(isopropylamino)ethyl]amine

The source of fluoride ions (F) can be any compound capable of releasing fluoride ions in the reaction mixture. Non-limiting examples of such sources of fluoride ions include salts containing one or several fluoride ions, such as metal fluorides (e.g., sodium fluoride, potassium fluoride, calcium fluoride, manganese fluoride, strontium fluoride, barium fluoride), ammonium fluoride, tetra-alkylammonium fluorides (e.g., tetramethylammonium fluoride, tetraethylammonium fluoride), hydrogen fluoride, fluorosilicic acid, hexafluorophosphoric acid, and mixtures thereof. Typically, the source of fluoride ions is hydrogen fluoride.

The reaction mixture can be prepared either batch-wise or continuously. Crystal size, morphology and crystallization time of the crystalline zeolite described herein can vary with the nature of the reaction mixture and the crystallization conditions.

In practice, the zeolite is prepared by (a) preparing a reaction mixture as described herein above and (b) maintaining the reaction mixture under crystallization conditions sufficient to form crystals of the zeolite.

The reaction mixture is maintained at an elevated temperature until the crystals of the zeolite are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by a person skilled in the art that the zeolites described herein may contain impurities, such as amorphous materials, unit cells having framework topologies which do not coincide with the zeolite, and/or other impurities (e.g., organic hydrocarbons).

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product obtained by promoting the nucleation and/or formation of the zeolite over any undesired phases. When used as seeds, seed crystals are added in an amount between 1% and 10% of the weight of the source for compositional variable T used in the reaction mixture.

Once the zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The zeolite can be used as-synthesized, but typically will be thermally treated (calcined). The term "as-synthesized" refers to the zeolite in its form after crystallization, prior to removal of the SDA. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the zeolite. The SDA can also be removed by photolysis techniques (e.g. exposing the SDA-containing zeolite product to light or electromagnetic radiation that has a wavelength shorter than visible light under conditions sufficient to selectively remove the organic compound from the zeolite) as described in U.S. Pat. No. 6,960,327.

The zeolite can subsequently be calcined in steam, air or inert gas at temperatures ranging from about 200° C. to about 800° C. for periods of time ranging from 1 to 48 hours, or more.

The zeolite made from the process of the present invention can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the zeolite can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

The LTA-type zeolite prepared by the process of this invention can be useful for catalytic processes, molecular separations (e.g., hydrophobic membranes) and for low dielectric constant (low-k) material fabrication.

Zeolites made by the process of the present invention have a composition, as-synthesized and in its anhydrous state, as described in Table 2 (in terms of mole ratios), wherein compositional variables T and Q are as described herein above:

TABLE 2

|  | Broad | Preferred |
|---|---|---|
| $TO_2/GeO_2$ | 1 to ∞ | 2 to 10 |
| $Q/(TO_2 + GeO_2)$ | 0.03 to 0.10 | 0.04 to 0.06 |

In one embodiment, zeolites made by the process of the present invention have a composition, as-synthesized and in its anhydrous state, as described in Table 3 (in terms of mole ratios), wherein Q is as described herein above:

TABLE 3

|  | Broad | Preferred |
|---|---|---|
| $SiO_2/GeO_2$ | 1 to 10 | 1.5 to 5 |
| $Q/(SiO_2 + GeO_2)$ | 0.03 to 0.10 | 0.04 to 0.06 |

Zeolites synthesized by the process of the present disclosure can be characterized by their XRD pattern. The XRD pattern for LTA-type zeolites is described. See, for example, M. M. J. Treacy et al., Collection of Simulated XRD Powder Patterns for Zeolites, 5th Revised Edition, 2007 of the International Zeolite Association. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the mole ratios of the framework species from sample to sample. Calcination can also cause minor shifts in the XRD pattern. Notwithstanding these minor perturbations, the basic crystal lattice structure remains unchanged.

The powder X-ray diffraction patterns presented herein were collected by standard techniques. The radiation was CuKα radiation. The peak heights and the positions, as a function of 2θ, where θ is the Bragg angle, were read from the relative intensities of the peaks (adjusting for background), and d, the interplanar spacing in Angstroms corresponding to the recorded lines, can be calculated.

EXAMPLES

The following examples are given to illustrate the present invention. It should be understood, however, that the invention is not to be limited to the specific conditions or details described in these examples.

Example 1

To a tared Teflon reactor was added 0.96 g of tetraethyl orthosilicate, 0.48 g of germanium ethoxide, 0.44 g of tris[2-(isopropylamino)ethyl]amine and 4 g of deionized water. The mixture was placed in a ventilation hood for several days to allow for hydrolysis and evaporation of excess water (approximately 2 weeks were needed). Then 0.13 g of a 50 wt. % HF solution and additional water were added to the dried solid and mixed well. The reaction mixture had the following mole ratios: 2.5 $SiO_2$:$GeO_2$:35 $H_2O$:0.875 tris[2-(isopropylamino) ethyl]amine: 1.75 HF.

The Teflon reactor was placed into a Parr reactor in an oven at 150° C. with tumbling (43 rpm) for 21 days. After the reaction was completed, the reaction mixture was removed and cooled to room temperature. Then the reactor contents were filtered, washed with distilled water and dried. The resulting crystals were LTA zeolite as determined by XRD. The product had a $SiO_2/GeO_2$ mole ratio of 2.98.

Example 2

The procedure from Example 1 was repeated except that the reaction mixture had a $SiO_2/GeO_2$ mole ratio of 10. The reaction was allowed to proceed for 42+ days. The resulting product was LTA zeolite as determined by XRD.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. An LTA-type zeolite having a composition, as synthesized and in its anhydrous state, as follows:

| | |
|---|---|
| $TO_2/GeO_2$ | 1 to ∞ |
| $Q/(TO_2 + GeO_2)$ | 0.03 to 0.10 | wherein T is a tetravalent element other than germanium and Q is a tris[2-(isopropylamino)ethyl]amine structure directing agent.

2. The zeolite of claim 1, wherein T is selected from the group consisting of Si, Ti, Sn, and mixtures thereof.

3. The zeolite of claim 2, wherein T is Si.

4. The zeolite of claim 3, wherein the $SiO_2/GeO_2$ mole ratio is from 1 to 10.

5. The zeolite of claim 3, wherein the $SiO_2/GeO_2$ mole ratio is from 1.5 to 5.

* * * * *